US010176000B2

(12) United States Patent
Li et al.

(10) Patent No.: US 10,176,000 B2
(45) Date of Patent: Jan. 8, 2019

(54) DYNAMIC ASSISTANT FOR APPLICATIONS BASED ON PATTERN ANALYSIS

(71) Applicant: INTERNATIONAL BUSINESS MACHINES CORPORATION, Armonk, NY (US)

(72) Inventors: Shuo Li, Beijing (CN); Xin Peng Liu, Beijing (CN); Meng Wan, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 389 days.

(21) Appl. No.: 15/055,706

(22) Filed: Feb. 29, 2016

(65) Prior Publication Data

US 2017/0249169 A1 Aug. 31, 2017

(51) Int. Cl.
*G06F 9/451* (2018.01)
*G06F 17/27* (2006.01)
(Continued)

(52) U.S. Cl.
CPC ............... *G06F 9/453* (2018.02); *G06F 8/38* (2013.01); *G06F 17/2705* (2013.01); *G06Q 30/0613* (2013.01)

(58) Field of Classification Search
CPC combination set(s) only.
See application file for complete search history.

(56) References Cited

U.S. PATENT DOCUMENTS 7,219,072 B1 5/2007 Sundaresan
8,554,638 B2 10/2013 Kirovski et al.
(Continued)

FOREIGN PATENT DOCUMENTS

CN 102170640 A 8/2011

OTHER PUBLICATIONS

Mell et al., "The NIST Definition of Cloud Computing," National Institute of Standards and Technology, Sep. 2011, p. 1-3, Special Publication 800-145.

*Primary Examiner* — Hien L Duong
(74) *Attorney, Agent, or Firm* — Erik K. Johnson; Robert C. Bunker

(57) ABSTRACT

A method for providing application assistants on applications is provided. The method may include performing pattern analyses on the applications, wherein application features are collected. The method may include determining application pattern types based on the pattern analyses. The method may include determining whether user customizations associated with the determined application pattern types are received. The method may include in response to the determination that user customizations are not received, associating the determined application pattern types with the applications, and generating application assistants based on the associated determined application pattern types. The method may include in response to the determination that user customizations are received, associating the user customizations with the applications, and generating application assistants based on the associated user customizations. The method may include presenting the generated application assistants in application assistant windows on the applications. The method may include executing actions on the generated application assistants.

17 Claims, 8 Drawing Sheets

(51) Int. Cl.
*G06F 8/38* (2018.01)
*G06Q 30/06* (2012.01)

(56) References Cited

U.S. PATENT DOCUMENTS

| | | | |
|---|---|---|---|
| 9,063,757 B2 | 6/2015 | Horton et al. | |
| 2011/0246880 A1* | 10/2011 | Horton | G06F 9/4446 715/708 |
| 2013/0031461 A1 | 1/2013 | Hou et al. | |
| 2013/0073369 A1* | 3/2013 | Begum | G06Q 30/0208 705/14.27 |
| 2013/0110923 A1* | 5/2013 | Overton | G06F 9/453 709/204 |
| 2013/0339115 A1* | 12/2013 | Soldate | G06Q 30/06 705/14.23 |
| 2014/0181651 A1* | 6/2014 | Yamamoto | G06F 9/453 715/705 |
| 2014/0317502 A1* | 10/2014 | Brown | G06F 9/453 715/706 |
| 2015/0286487 A1* | 10/2015 | Glass | H04M 3/51 715/707 |
| 2015/0294390 A1* | 10/2015 | Fan | G06Q 30/0605 705/26.4 |
| 2017/0140285 A1* | 5/2017 | Dotan-Cohen | G06N 5/048 |
| 2017/0148046 A1* | 5/2017 | Akbarpour Mashadi | G06Q 30/0239 |
| 2017/0236153 A1* | 8/2017 | Ouimet | G06Q 30/0253 705/14.51 |
| 2017/0249169 A1* | 8/2017 | Li | G06F 9/4446 |

* cited by examiner

DYNAMIC ASSISTANT FOR APPLICATIONS BASED ON PATTERN ANALYSIS

BACKGROUND

The present invention relates generally to the field of computing, and more specifically, to application interfaces.

Generally, applications may include application options and features. For example, a browsing application may present a shopping page that may include options and features such as lists of items, pictures of the items, item descriptions, price information, and "add to cart" options that may be viewed on the shopping page. Also, for example, a social media application may present a social media page that may include options and features such as status updating, pictures, comments, and "like" options that may be viewed on a social media page. Furthermore, the applications may enable users to use the options and features of the applications that are viewed on the pages. Specifically, the applications may enable users to perform such actions as adding items to a virtual shopping cart, updating social media statuses on the social media view page, and viewing pictures on the browser page and the social media page.

SUMMARY

A method for providing at least one application assistant on at least one application is provided. The method may include performing at least one pattern analysis on the at least one application, wherein a plurality of application features are collected based on the at least one pattern analysis. The method may include determining at least one application pattern type based on the at least one pattern analysis. The method may include determining whether at least one user customization associated with the determined at least one application pattern type is received. The method may include in response to the determination that the at least one user customization is not received, associating the determined at least one application pattern type with the at least one application, and generating at least one application assistant based on the associated determined at least one application pattern type. The method may include in response to the determination that the at least one user customization is received, associating the at least one user customization with the at least one application, and generating the at least one application assistant based on the associated at least one user customization. The method may include presenting the generated at least one application assistant in at least one application assistant window on the at least one application. The method may include executing at least one action on the at least one generated application assistant based on at least one user action associated with the at least one application.

A computer system for providing at least one application assistant on at least one application is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include performing at least one pattern analysis on the at least one application, wherein a plurality of application features are collected based on the at least one pattern analysis. The method may include determining at least one application pattern type based on the at least one pattern analysis. The method may include determining whether at least one user customization associated with the determined at least one application pattern type is received. The method may include in response to the determination that the at least one user customization is not received, associating the determined at least one application pattern type with the at least one application, and generating at least one application assistant based on the associated determined at least one application pattern type. The method may include in response to the determination that the at least one user customization is received, associating the at least one user customization with the at least one application, and generating the at least one application assistant based on the associated at least one user customization. The method may include presenting the generated at least one application assistant in at least one application assistant window on the at least one application. The method may include executing at least one action on the at least one generated application assistant based on at least one user action associated with the at least one application.

A computer program product for providing at least one application assistant on at least one application is provided. The computer program product may include one or more computer-readable storage devices and program instructions stored on at least one of the one or more tangible storage devices, the program instructions executable by a processor. The computer program product may include program instructions to perform at least one pattern analysis on the at least one application, wherein a plurality of application features are collected based on the at least one pattern analysis. The computer program product may further include program instructions to determine at least one application pattern type based on the at least one pattern analysis. The computer program product may also include program instructions to determining whether at least one user customization associated with the determined at least one application pattern type is received. The computer program product may further include program instructions to, in response to the determination that the at least one user customization is not received, associate the determined at least one application pattern type with the at least one application, and generate at least one application assistant based on the associated determined at least one application pattern type. The computer program product may also include program instructions to, in response to the determination that the at least one user customization is received, associate the at least one user customization with the at least one application, and generating the at least one application assistant based on the associated at least one user customization. The computer program product may further include program instructions to present the generated at least one application assistant in at least one application assistant window on the at least one application. The computer program product may also include program instructions to execute at least one action on the at least one generated application assistant based on at least one user action associated with the at least one application.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
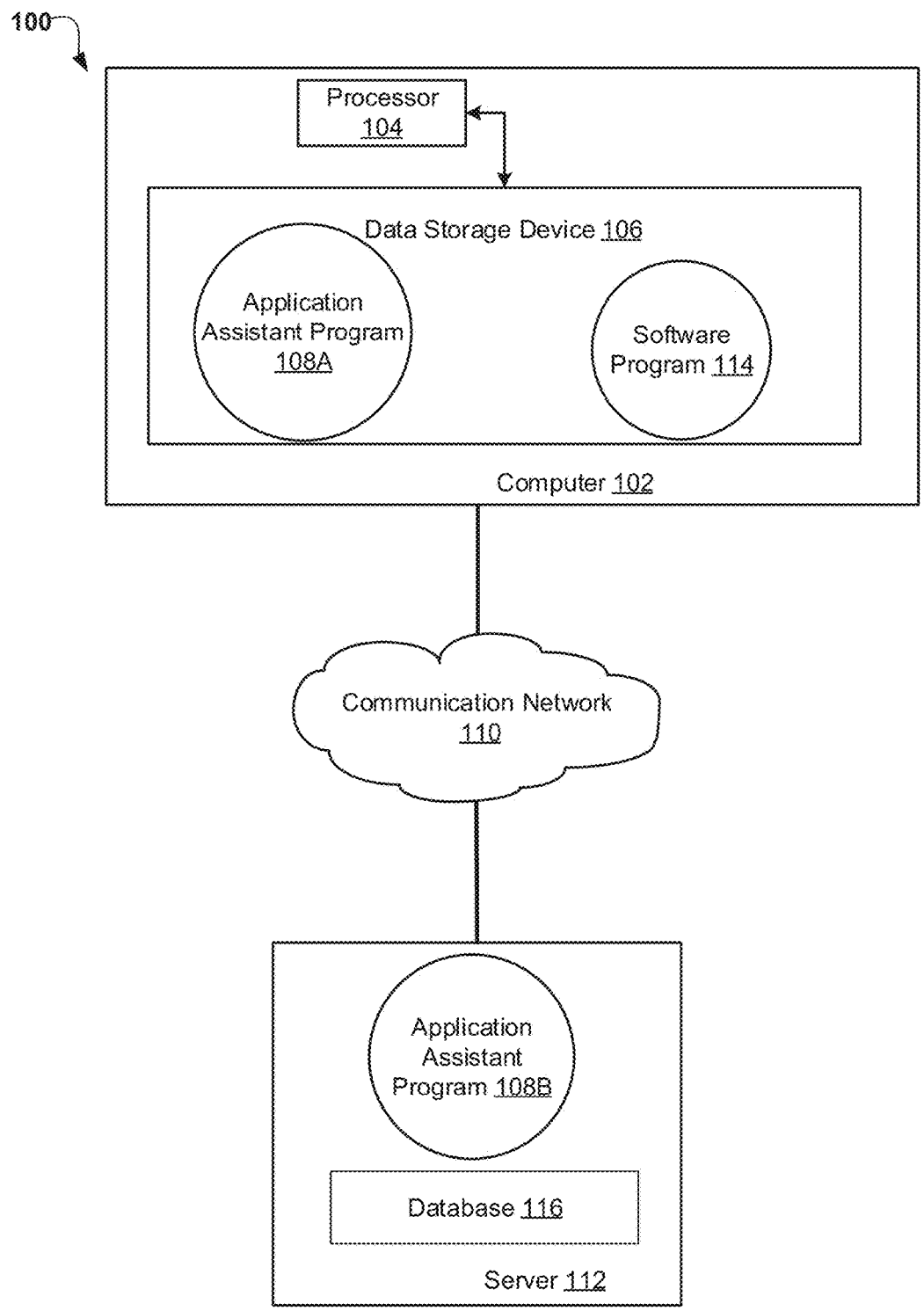
FIG. 1 illustrates a networked computer environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate generally to the field of computing, and more particularly, to application interfaces. The following described exemplary embodiments provide a system, method and program product for providing application assistants on applications based on application features. Therefore, the present embodiment has the capacity to improve the technical field of application interfaces by associating application assistants with applications to enable the applications to allow users to perform actions on the application. Specifically, the present embodiment may analyze the features associated with the applications to determine the application patterns, and based on the application patterns, may enable the applications to generate, associate, and present application assistants on the applications to enable users to perform actions associated with the application.

As previously described with respect to application interfaces, applications may include options and features associated with the applications. For example, a browsing application may include a shopping page that may include options and features such as lists of items, pictures of the items, item descriptions, price information, and "add to cart" options on the shopping page. Furthermore, based on the "add to cart" option, the browsing application may enable users to perform such actions as adding items to a virtual shopping cart. However, to enable users to perform such actions as viewing the added items on the virtual shopping cart, checking the total price for the added items, and/or determining currency conversions for the added items, the browsing application may need to switch to, or navigate from, the shopping page to a different page and/or to a different application. Therefore, users may not view and browse the lists of items on the shopping page because of the switch to the different page or the different application. Also, as previously described, a social media application may include a social media page that may include features such as status updating, pictures, comments, and "like" options on the social media page. However, to enable users to perform such actions as editing the pictures on the social media page, the social media application may need to switch to or present a different application to edit the pictures. Therefore, users may not view the application features associated with the social media view page based on the presentment of the different application to edit the pictures.

Specifically, applications that may include view pages, such as web browser applications and social media applications, may not enable users to perform actions on the application while maintaining specified view pages (e.g. not enabling users to edit pictures while maintaining a specified social media view page on the application). As such, it may be advantageous, among other things, to provide a system, method and program product for providing application assistants on applications to enable users to perform actions while maintaining specified pages on the application. Specifically, the system, method and program product may analyze the features associated with the applications to determine the application patterns, and based on the application patterns, may generate, associate, and present application assistants on the applications to enable users to perform actions associated with the application features and maintain specified pages on the application.

According to at least one implementation of the present embodiment, pattern analyses may be performed on applications. Then, based on the performed pattern analyses, application pattern types may be determined. Next, whether user customizations associated with the determined application pattern types are received may be determined. Then, in response to the determination that user customizations are not received, generating application assistants based on the determined application pattern types. Alternatively, in response to the determination that user customizations are received, integrating the received user customizations with the determined application pattern types. Next, generating the application assistants based on the determined application pattern types with the received user customizations. Then, presenting the generated application assistants. Next, performing actions on the application assistant based on user input on the applications.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for generating and presenting application assistants with applications based on application features.

According to at least one implementation, pattern analyses may be performed on applications. Then, based on the performed pattern analyses, application pattern types may be determined. Next, whether user customizations associated with the determined application pattern types are received may be determined. Then, in response to the determination that user customizations are not received, generating application assistants based on the determined application pattern types. Alternatively, in response to the determination that user customizations are received, integrating the received user customizations with the determined application pattern types. Next, generating the application assistants based on the determined application pattern types with the received user customizations. Then, presenting the generated application assistants. Next, executing actions on the application assistant based on user input on the applications.

Referring now to FIG. 1, an exemplary networked computer environment 100 in accordance with one embodiment is depicted. The networked computer environment 100 may include a computer 102 with a processor 104 and a data storage device 106 that is enabled to run an application assistant program 108A and a software program 114. The software program 114 may be an application program such as an internet browser and an email program. The application assistant program 108A may communicate with the software program 114. The networked computer environment 100 may also include a server 112 that is enabled to run an application assistant program 108B and a communication network 110. The networked computer environment 100 may include a plurality of computers 102 and servers 112, only one of which is shown for illustrative brevity.

According to at least one implementation, the present embodiment may also include a database 116, which may be running on server 112. The communication network 110 may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with server computer 112 via the communications network 110. The communications network 110 may include connections, such as wire, wireless communication links, or fiber optic cables. As will be discussed with reference to FIG. 6, server computer 112 may include internal components 810a and external components 910a, respectively, and client computer 102 may include internal components 810b and external components 910b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing device capable of running a program and accessing a network. According to various implementations of the present embodiment, the application assistant program 108A, 108B may interact with a database 116 that may be embedded in various storage devices, such as, but not limited to a mobile device 102, a networked server 112, or a cloud storage service.

According to the present embodiment, a program, such as an application assistant program 108A and 108B may run on the client computer 102 or on the server computer 112 via a communications network 110. The application assistant program 108A, 108B may provide application assistants on applications based on application patterns. Specifically, a user using a computer, such as computer 102, may run an application assistant program 108A, 108B, that interacts with a software program 114, to analyze features associated with the software program 114, to determine the pattern associated with the software program 114, and based on the determined patterns associated with the software program 114, may enable the application assistant program 108A, 108B to generate, associate, and present application assistants on the software program 114 to enable users to perform actions associated with the software program 114.

Figure 2:
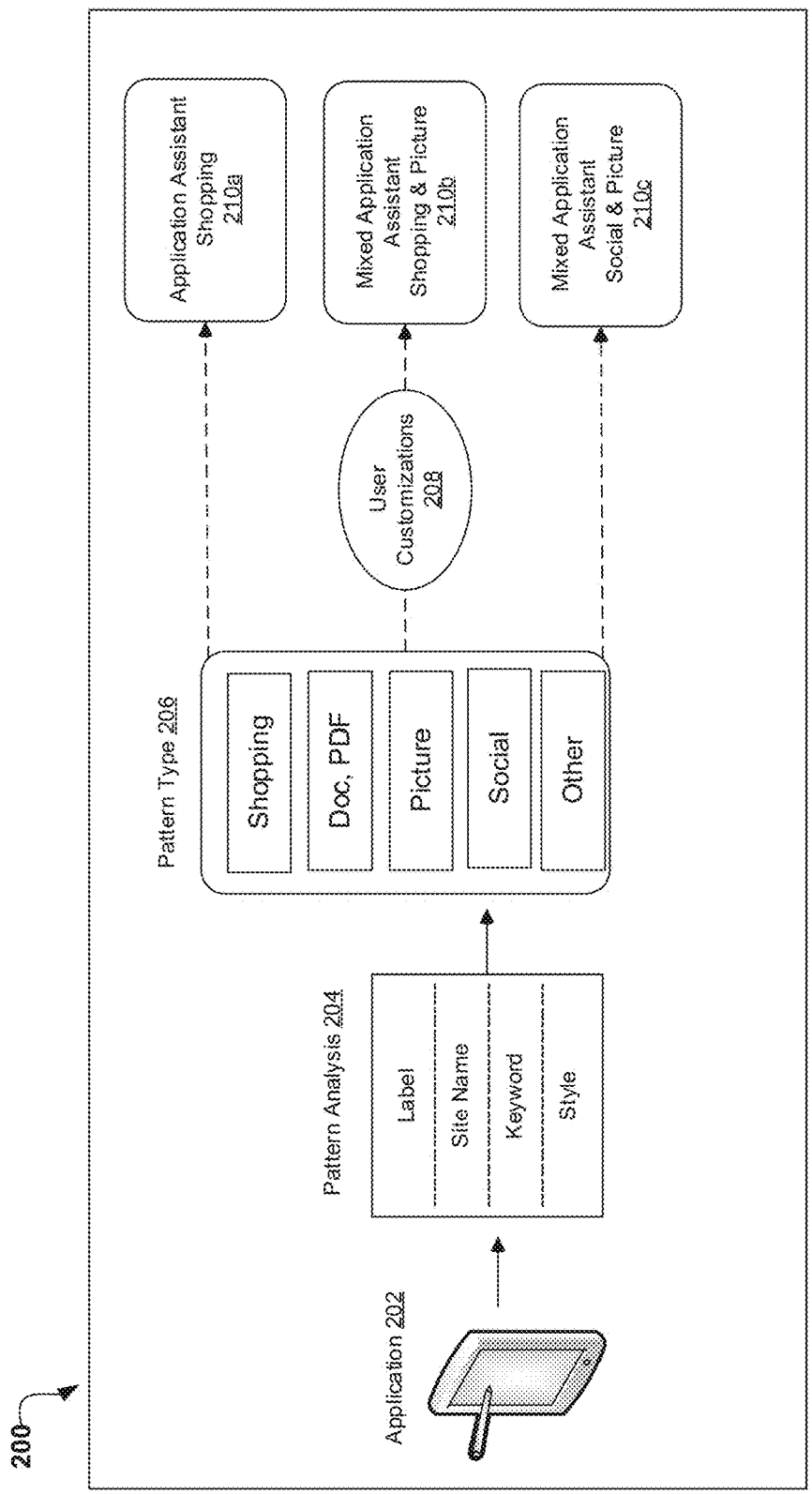
FIG. 2 is a block diagram illustrative of a system architecture of an application assistant program according to one embodiment.

Referring now to FIG. 2, a block diagram 200 illustrative of a system architecture of an application assistant program 108A, 108B (FIG. 1) is depicted. As previously described in FIG. 1, the application assistant program 108A, 108B (FIG. 1) may generate and present application assistants on applications based on application features. Specifically, the applications 202 may include application features such as labels, site names, logos, keywords, and styles. As such, at 204, the application assistant program 108A, 108B (FIG. 1) may perform pattern analysis on the applications 202 to collect the application features. Thereafter, based on the pattern analysis 204, the application assistant program 108A, 108B (FIG. 1) may determine the application pattern type at 206.

For example, based on the pattern analysis 204, the application assistant program 108A, 108B (FIG. 1) may determine that the application 202 is a shopping website based on the site name, such as Amazon.com® (Amazon.com and all Amazon.com-based trademarks and logos are trademarks or registered trademarks of Amazon.com, Inc. and/or its affiliates). Therefore, the application assistant program 108A, 108B (FIG. 1) may determine that the application pattern type 206 for the website is a shopping pattern and may generate an application assistant 210a based on the shopping pattern. Also, for example, based on the pattern analysis 204, the application assistant program 108A, 108B (FIG. 1) may determine that an application is a social application based on application features such as the logo of Facebook® (Facebook and all Facebook—based trademarks and logos are trademarks or registered trademarks of Facebook, Inc. and/or its affiliates), and may also determine that the application includes pictures. Therefore, the application assistant program 108A, 108B (FIG. 1) may determine that the application pattern types 206 for the application are a social pattern and a picture pattern, and may generate a mixed application assistant 210c based on the social pattern and picture pattern.

Furthermore, the application assistant program 108A, 108B (FIG. 1) may enable users to customize the application assistants 210a, 210b, 210c by receiving application pattern types based on user input. For example, based on the pattern analysis 204, the application assistant program 108A, 108B (FIG. 1) may determine that the application pattern type 206 for the application 202 is a shopping pattern, but the user may further want to edit the pictures, or may want to just edit the pictures, on the shopping website. Therefore, in response to receiving user customizations 208, the application assistant program 108A, 108B (FIG. 1) may associate the picture pattern type and/or the determined shopping pattern type with the website, and may generate a mixed application assistant 210b based on the shopping pattern and picture pattern to enable users to perform shopping actions and editing picture actions.

Figure 3:
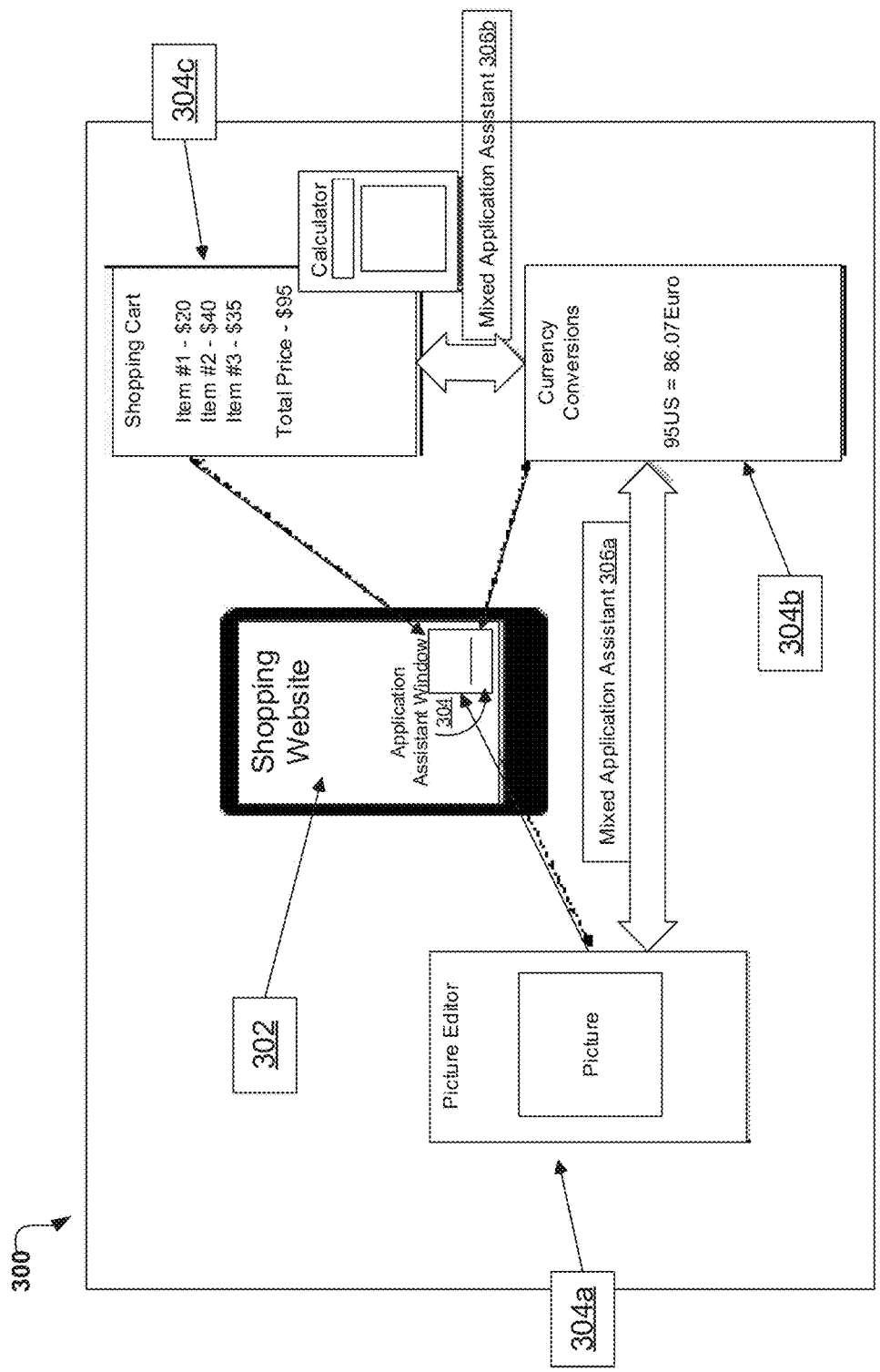
FIG. 3 are examples of application assistants according to one embodiment.

Referring now to FIG. 3, example 300 of application assistants 304a, 304b, and 304c according to one embodiment is depicted. As previously described in FIG. 2, the application assistant program 108A, 108B (FIG. 1) may generate application assistants 210a, 210b, and 210c (FIG. 2) based on a determined pattern associated with the application 202 (FIG. 2). For example, the application assistant program 108A, 108B (FIG. 1) may determine that a website is presented on the application 302 and that the website is a shopping website. Thus, the application assistant program 108A, 108B (FIG. 1) may determine that the application pattern type 206 (FIG. 2) is a shopping pattern. As such, the application assistant program 108A, 108B (FIG. 1) may generate and associate application assistants 304a, 304b, and 304c with the application 302. Specifically, the application assistant program 108A, 108B (FIG. 1) may present the applications assistants 304a, 304b, and 304c on application assistant windows 304, whereby the application assistant windows 304 may be floating and/or fixed windows on the application 302. Furthermore, the application assistant program 108A, 108B (FIG. 1) may generate and present application assistant windows 304 that may include mixed application assistants 306a, 306b based on determined application pattern types 206 (FIG. 2) and user customizations 208 (FIG. 2), such as a picture and a currency conversion mixed application assistant 306a, and a shopping pattern and currency conversion mixed application assistant 306b.

Figure 4:
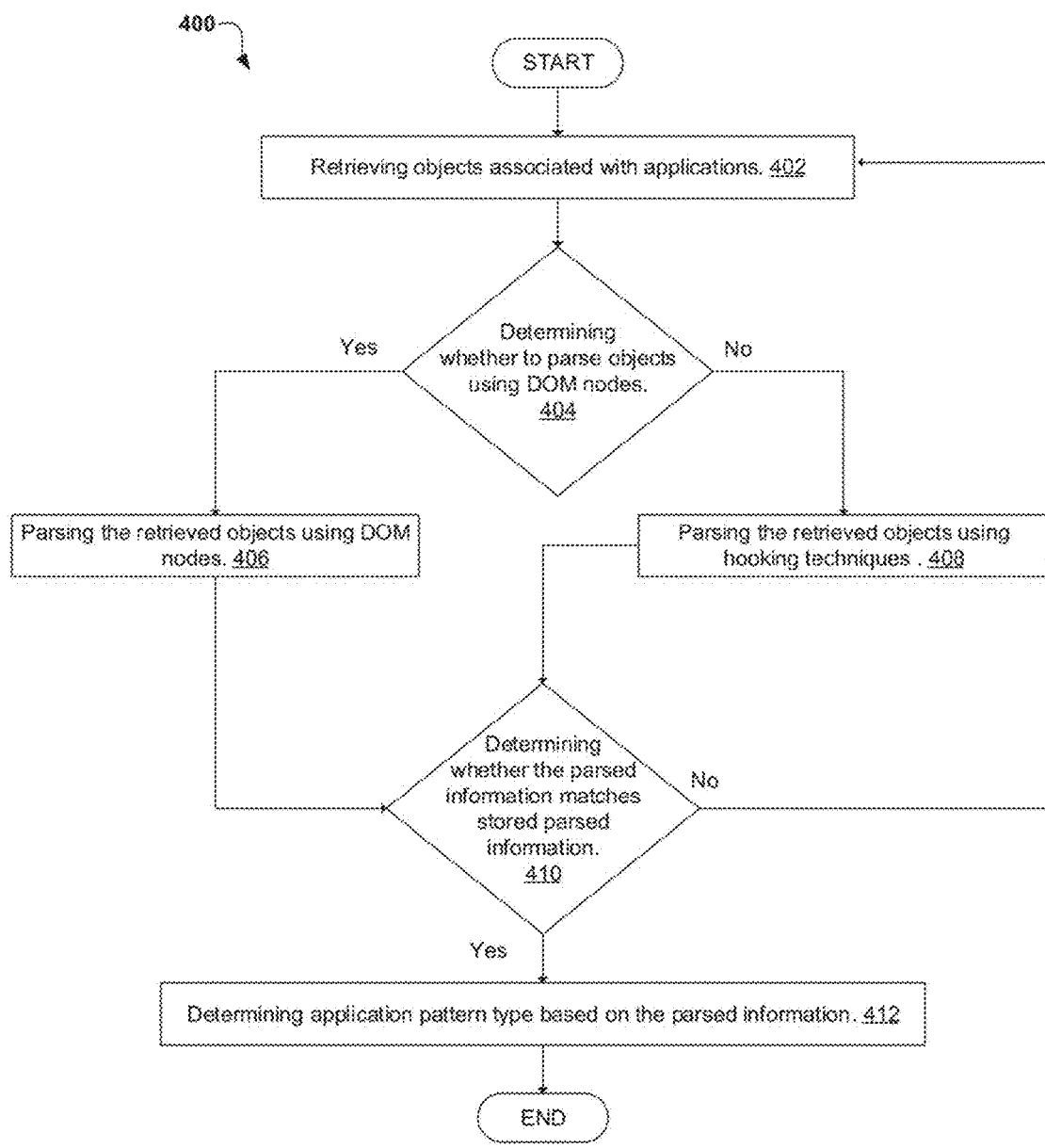
FIG. 4 is an operational flowchart for pattern analyses illustrating the steps carried out by a program for performing pattern analyses on applications according to one embodiment.

Referring now to FIG. 4, an operational flowchart for pattern analyses 400 illustrating the steps carried out by a program for performing pattern analyses 204 (FIG. 2) on applications according to one embodiment is depicted. At 402, the application assistant program 108A, 108B (FIG. 1) may retrieve objects associated with the applications 202 (FIG. 2) to collect the application features associated with the applications 202 (FIG. 2). For example, and as previously described in FIG. 2, the application assistant program 108A, 108B (FIG. 1) may collect application features, such as website names, labels, keywords, and style, that are associated with a web browser application 202 (FIG. 2).

Next, at 404, the application assistant program 108A, 108B (FIG. 1) may determine whether to parse the retrieved objects using DOM (documentation object model) nodes associated with the objects. Specifically, the application assistant program 108A, 108B (FIG. 1) may parse information associated with the retrieved DOM nodes by retrieving a source page associated with the applications 202 (FIG. 2) to collect the application features. For example, the application assistant program 108A, 108B (FIG. 1) may retrieve the html source page associated with an application 202 (FIG. 2) such as an email website. Then, the application assistant program 108A, 108B (FIG. 1) may retrieve the objects associated with the source page which may include interface information, buttons and text associated with the application 202 (FIG. 2).

Then, at 406, in response to the determination to parse the retrieved objects using the application DOM nodes, the application assistant program 108A, 108B (FIG. 1) may parse the information associated with the retrieved objects using the DOM nodes. Specifically, the application assistant program 108A, 108B (FIG. 1) may parse information using DOM nodes such as <div> and <label>, based on the html source pages that are associated with the applications 202 (FIG. 2). Thereafter, the application assistant program 108A, 108B (FIG. 1) may parse the information associated with the DOM nodes <div> and <label>. For example, based on the DOM node <label>, the application assistant program 108A, 108B (FIG. 1) may parse labels associated with different application buttons, such as "forward email", "reply to", "place order", and "add to cart".

At 408, in response to the determination to not parse the retrieved objects using DOM nodes, the application assistant program 108A, 108B (FIG. 1) may use hooking techniques to parse the information associated with the retrieved objects. As previously described at steps 404 and 406, the application assistant program 108A, 108B (FIG. 1) may retrieve source pages associated with the applications 202 (FIG. 2) and use the DOM nodes on the source pages to parse the retrieved objects. However, in response to not retrieving the source pages and/or the DOM nodes, the application assistant program 108A, 108B (FIG. 1) may parse information associated with the retrieved objects using hooking techniques. Specifically, the application assistant program 108A, 108B (FIG. 1) may use hooks to parse the objects associated with the applications 202 (FIG. 2) and use hook servers to collect the application features associated with the parsed objects. Furthermore, the application assistant program 108A, 108B (FIG. 1) may enable options for users to close the hooks.

Next, at 410, the application assistant program 108A, 108B (FIG. 1) may determine whether the parsed information matches stored parsed information. As previously described in steps 402-408, the application assistant program 108A, 108B (FIG. 1) may parse retrieved objects to collect application features associated with the retrieved objects. Thereafter, the application assistant program 108A, 108B (FIG. 1) may determine whether with parsed information, that may include the collected application features matches stored parsed information that may include stored application features. Specifically, the stored parsed information may include collected application features as well as defined application features that may be stored on a storage library, such as the database 116 (FIG. 1). More specifically, the defined application features may include features based on popular applications such as shopping website Amazon.com® and email website Gmail® (Gmail and all Gmail-based trademarks and logos are trademarks or registered trademarks of Google, Inc. and/or its affiliates). Furthermore, the application assistant program 108A, 108B (FIG. 1) may store the application pattern types 206 (FIG. 2) that are associated with the stored application features. However, in response to the determination that the parsed information does not match the stored parsed information, the application assistant program 108A, 108B (FIG. 1) may return to step 402 to retrieve objects associated with the applications 202 (FIG. 2).

For example, based on the parsed information, the application assistant program 108A, 108B (FIG. 1) may collect application features that may include keywords such as "price", "on sale", and "bestsellers", that are associated with a website application 302 (FIG. 3). Thereafter, the application assistant program 108A, 108B (FIG. 1) may compare the collected keywords to the stored keywords, based on the stored parsed information, that may be associated with a website such as Amazon.com®. Then, based on the comparison, the application assistant program 108A, 108B (FIG. 1) may determine that the collected application features may match the stored application features associated with the website Amazon.com®. Additionally, the application assistant program 108A, 108B (FIG. 1) may store the collected application features associated with the website application 302 (FIG. 3) for use when determining whether collected application features match stored application features.

Also, for example, based on the DOM node <label>, the application assistant program 108A, 108B (FIG. 1) may parse labels associated with different application buttons, such as "forward email" and "reply to". Thereafter, the application assistant program 108A, 108B (FIG. 1) may compare the parsed labels to stored parsed labels, such as the stored parsed labels associated with the application Gmail®, and determine that the parsed labels and the stored parsed labels match.

Next, at 412, the application assistant program 108A, 108B (FIG. 1) may determine the application pattern type 206 (FIG. 2) based on the parsed information. Specifically, in response to the determination at step 410 that the parsed information that may include the collected application features matches stored parsed information that may include stored application features, the application assistant program 108A, 108B (FIG. 1) may determine the application pattern types 206 (FIG. 2).

As previously described at step 410, the application assistant program 108A, 108B (FIG. 1) may include stored parsed information and the application pattern types 206 (FIG. 2) that are associated with the stored parsed information. Therefore, based on the determination that the parsed information matches the stored parsed information, the application assistant program 108A, 108B (FIG. 1) may determine that the application pattern types 206 (FIG. 2) associated with the stored parsed information may match the parsed information, respectively.

For example, based on the DOM node <label> associated with an application 202 (FIG. 2), the application assistant program 108A, 108B (FIG. 1) may parse label information associated with the different application buttons, such as the "forward email" button and the "reply to" button. Thereafter, the application assistant program 108A, 108B (FIG. 1) may compare the parsed label information to stored parsed label information, such as the stored parsed label information associated with the application Gmail®, and determine that the parsed label information matches the stored parsed label information that is associated with Gmail®. Furthermore, the application assistant program 108A, 108B (FIG. 1) may determine that the application pattern type 206 (FIG. 2) that is based on the matching stored parsed information associated with the Gmail® application is an email pattern. Therefore, the application assistant program 108A, 108B (FIG. 1) may determine that the matching parsed information associated with the application 202 (FIG. 2) may include an email pattern.

Figure 5:
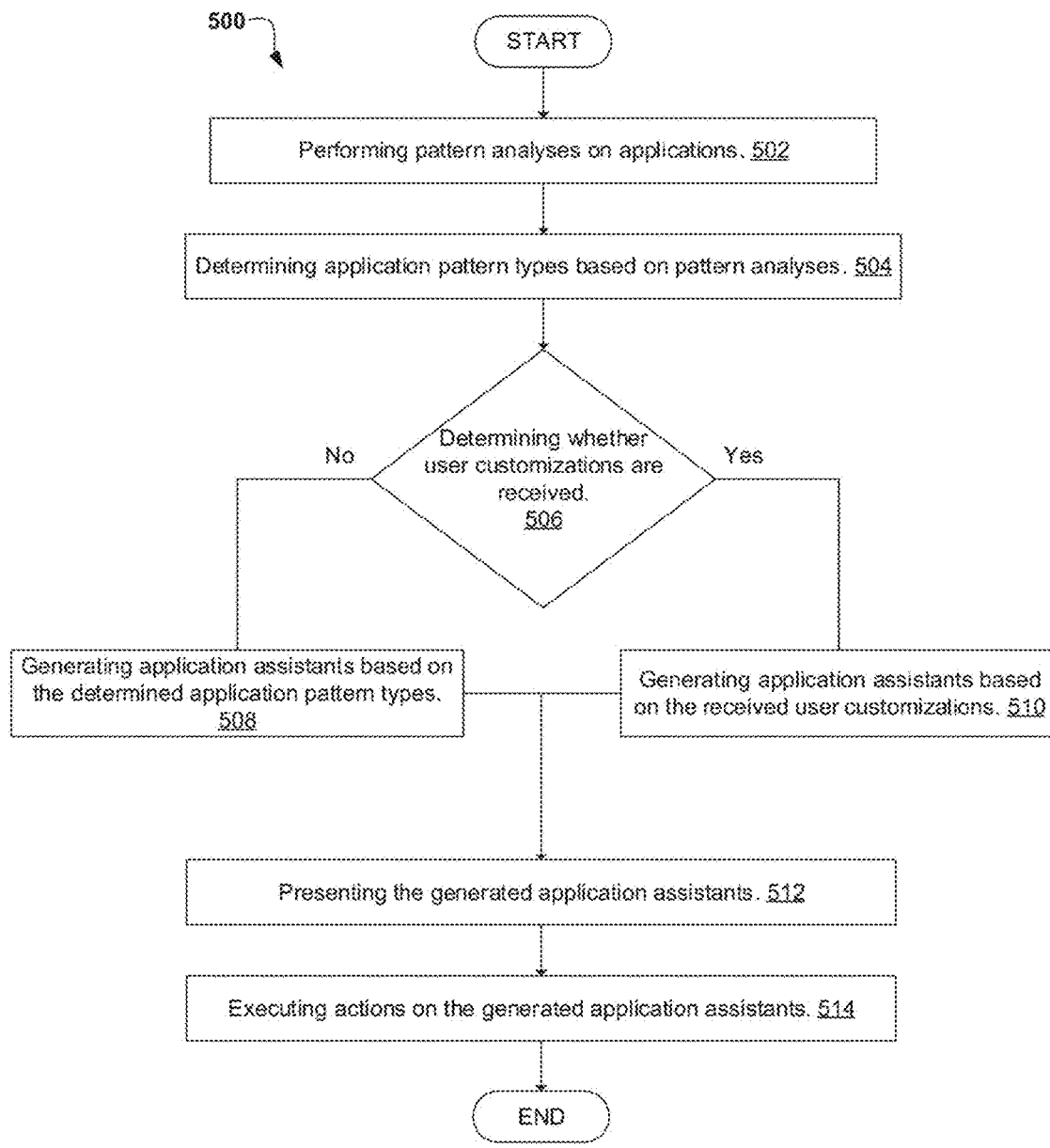
FIG. 5 is an operational flowchart for associating and generating application assistants according to one embodiment.

Referring now to FIG. 5, an operational flowchart for application assistant association and generation 500, illustrating the steps carried out by a program for associating and generating application assistants 304a, 304b, 304c (FIG. 3) according to one embodiment is depicted. At 502, and as previously described in FIGS. 2 and 4, the application assistant program 108A, 108B (FIG. 1) may perform pattern analyses (FIG. 4) on the applications 302 (FIG. 3). For example, the applications 302 (FIG. 3) may include application features such as labels, site names, logos, keywords, and styles. As such, the application assistant program 108A, 108B (FIG. 1) may perform pattern analyses (FIG. 4) on the applications 302 (FIG. 3) using DOM nodes or hooking techniques to collect the application features. For example, and as previously described in FIG. 4, the application assistant program 108A, 108B (FIG. 1) may retrieve DOM nodes associated with the applications 302 (FIG. 3). Thereafter, and as further described in FIG. 4, the application assistant program 108A, 108B (FIG. 1) may determine whether the parsed information associated with the DOM nodes matches the stored parsed information.

Next, at 504, the application assistant program 108A, 108B (FIG. 1) may determine the application pattern types 206 (FIG. 2) for the applications 302 (FIG. 3) based on the pattern analyses (FIG. 4). Specifically, and as previously described in FIG. 4, in response to the determination at step 410 (FIG. 4) that the collected application features associated with the parsed information match the stored application features associated with the stored parsed information, the application assistant program 108A, 108B (FIG. 1) may determine the application pattern types 206 (FIG. 2). For example, the application assistant program 108A, 108B (FIG. 1) may retrieve objects associated with website applications 302 (FIG. 3) and parse the retrieved objects to collect application features that may include keywords such as "price", "on sale", and "bestsellers", that are associated with the website applications 302 (FIG. 3). Thereafter, the application assistant program 108A, 108B (FIG. 1) may compare the collected keywords to the stored keywords that may be associated with an application such as Amazon.com®. Then, based on the comparison, the application assistant program 108A, 108B (FIG. 1) may determine that the collected application features may match the stored application features associated with the website Amazon.com®. Furthermore, the application assistant program 108A, 108B (FIG. 1) may determine that the application pattern type 206 (FIG. 2) that is based on the matching stored application features associated with the Amazon.com® application is a shopping pattern. Therefore, the application assistant program 108A, 108B (FIG. 1) may determine that, based on the matching collected application features, the application 302 (FIG. 3) may include a shopping pattern.

Then, at 506, based on the determined application pattern types, the application assistant program 108A, 108B (FIG. 1) may determine whether user customizations 208 (FIG. 2) are received. As previously described in FIG. 2, the application assistant program 108A, 108B (FIG. 1) may enable users to customize the application assistants 210a, 210b, 210c (FIG. 2) by receiving application pattern types based on user input. For example, based on the pattern analyses (FIG. 4), the application assistant program 108A, 108B (FIG. 1) may determine a shopping pattern for the application 202 (FIG. 2), but the user may also want to edit pictures on the shopping application, or may just want to edit pictures on the shopping application. Therefore, the application assistant program 108A, 108B (FIG. 1) may receive user customizations 208 (FIG. 2) based on user input that may include selections of different application pattern types 206 (FIG. 2).

Thereafter, at 508, in response to the determination that no user customizations 208 (FIG. 2) are received, the application assistant program 108A, 108B (FIG. 1) may associate and generate application assistants 210a, 210b, and 210c (FIG. 2) based on the determined application types 206 (FIG. 2). For example, based on the pattern analyses (FIG. 4), the application assistant program 108A, 108B (FIG. 1) may determine that the application 202 (FIG. 2) is a shopping website based on the site name, such as Amazon.com® (Amazon.com and all Amazon.com-based trademarks and logos are trademarks or registered trademarks of Amazon- .com and/or its affiliates). Therefore, the application assistant program 108A, 108B (FIG. 1) may determine that the application pattern type 206 (FIG. 2) for the website is a shopping pattern. Then, the application assistant program 108A, 108B (FIG. 1) may associate the shopping pattern with the application 202 (FIG. 2), and may generate the shopping application assistant 210a (FIG. 2) based on the shopping pattern.

Furthermore, at 510, in response to the determination that the user customizations 208 (FIG. 2) are received, the application assistant program 108A, 108B (FIG. 1) may associate and generate the application assistants 210a, 210b, and 210c (FIG. 2) based on the received user customizations. For example, based on the pattern analyses (FIG. 4), the application assistant program 108A, 108B (FIG. 1) may determine that the application pattern type 206 (FIG. 2) for the application 202 (FIG. 2) is a shopping pattern, but the user may further want to the edit pictures, or may want to just edit the pictures, on the shopping website. Therefore, in response to receiving user customizations 208 (FIG. 2), the application assistant program 108A, 108B (FIG. 1) may associate the picture pattern type and/or the determined shopping pattern type with the website, and may generate a mixed application assistant 210b (FIG. 2) based on the shopping pattern and picture pattern to enable users to perform shopping actions and editing picture actions.

Next, at 512, the application assistant program 108A, 108B (FIG. 1) may present the generated application assistants 304a, 304b, 304c (FIG. 3) on the application 302 (FIG. 3). Specifically, and as previously described in FIG. 3, the application assistant program 108A, 108B (FIG. 1) may present the applications assistants 304a, 304b, and 304c (FIG. 3) on application assistant windows 304 (FIG. 3), whereby the application assistant windows 304 (FIG. 3) may be floating and/or fixed windows on the application 302 (FIG. 3). Furthermore, the application assistant program 108A, 108B (FIG. 1) may generate and present application assistant windows 304 (FIG. 3) that may include mixed application assistants 306a, 306b (FIG. 3) based on determined application pattern types 206 (FIG. 2) and user customizations 208 (FIG. 2), such as a picture and a currency conversion mixed application assistant 306a (FIG. 3), and a shopping pattern and currency conversion mixed application assistant 306b (FIG. 3).

Then, at 514, the application assistant program 108A, 108B (FIG. 1) may execute actions on the generated application assistants 304a, 304b, 304c (FIG. 3) based on user input associated with the applications 302 (FIG. 3). As previously described at step 512, the application assistant program 108A, 108B (FIG. 1) may present the generated application assistants 304a, 304b, 304c (FIG. 3) on fixed and/or floating windows 304 (FIG. 3) on the applications 302 (FIG. 3). Thereafter, the application assistant program 108A, 108B (FIG. 1) may execute actions on the generated application assistants 304a, 304b, 304c (FIG. 3) based on user input associated with the applications 302 (FIG. 3). For example, the application assistant program 108A, 108B (FIG. 1) may generate application assistants 304a, 304b, 304c (FIG. 3) based on a shopping pattern type 304c (FIG. 3) and a currency conversion pattern type 304b (FIG. 3) that are associated with a shopping website application 302 (FIG. 3).

Then, based on user input associated with the shopping website application 302 (FIG. 3), such as a user clicking on "add to cart" buttons to add items to a shopping cart, the application assistant program 108A, 108B (FIG. 1) may execute actions on the application assistants 304c, 304b (FIG. 3) that are on the application assistant window 304 (FIG. 3), and the executed actions may include adding the items to the application assistant 304c (FIG. 3) and calculating the total price of the added items, as well as determining the currency conversion for the added items on the application assistant 304b (FIG. 3). Also, for example, the application assistant program 108A, 108B (FIG. 1) may execute actions on the application assistants 304a, 304b, and 304c (FIG. 3) such as translating applications 302 (FIG. 3) based on translator application pattern types 206 (FIG. 2), editing pictures associated with applications based on picture application pattern types 206 (FIG. 2), and updating statuses based on social application pattern types 206 (FIG. 2).

It may be appreciated that FIGS. 1-5 provide only illustrations of one implementation and do not imply any limitations with regard to how different embodiments may be implemented. Many modifications to the depicted environments may be made based on design and implementation requirements. For example, the application assistant program 108A, 108B (FIG. 1) may determine the application pattern type 206 (FIG. 2) associated with the applications 202 (FIG. 2) without retrieving and parsing the objects associated with the applications 202 (FIG. 2). Specifically, the application assistant program 108A, 108B (FIG. 1) may determine that the application is a website. Then, the application assistant program 108A, 108B (FIG. 1) may retrieve the website address and compare the retrieved website address to stored website addresses. As such, the application assistant program 108A, 108B (FIG. 1) may determine the application pattern type 206 (FIG. 2) based on whether the retrieved website address matches the stored website addresses without retrieving and parsing the objects associated with the applications 202 (FIG. 2). However, in response to the determination that the application 202 (FIG. 2) is not a website, that the application 202 (FIG. 2) website cannot be retrieved, and/or that the retrieved website address does not match the stored website addresses, the application assistant program 108A, 108B (FIG. 1) may execute the steps for performing pattern analyses 204 (FIG. 2) according to FIG. 4.

Figure 6:
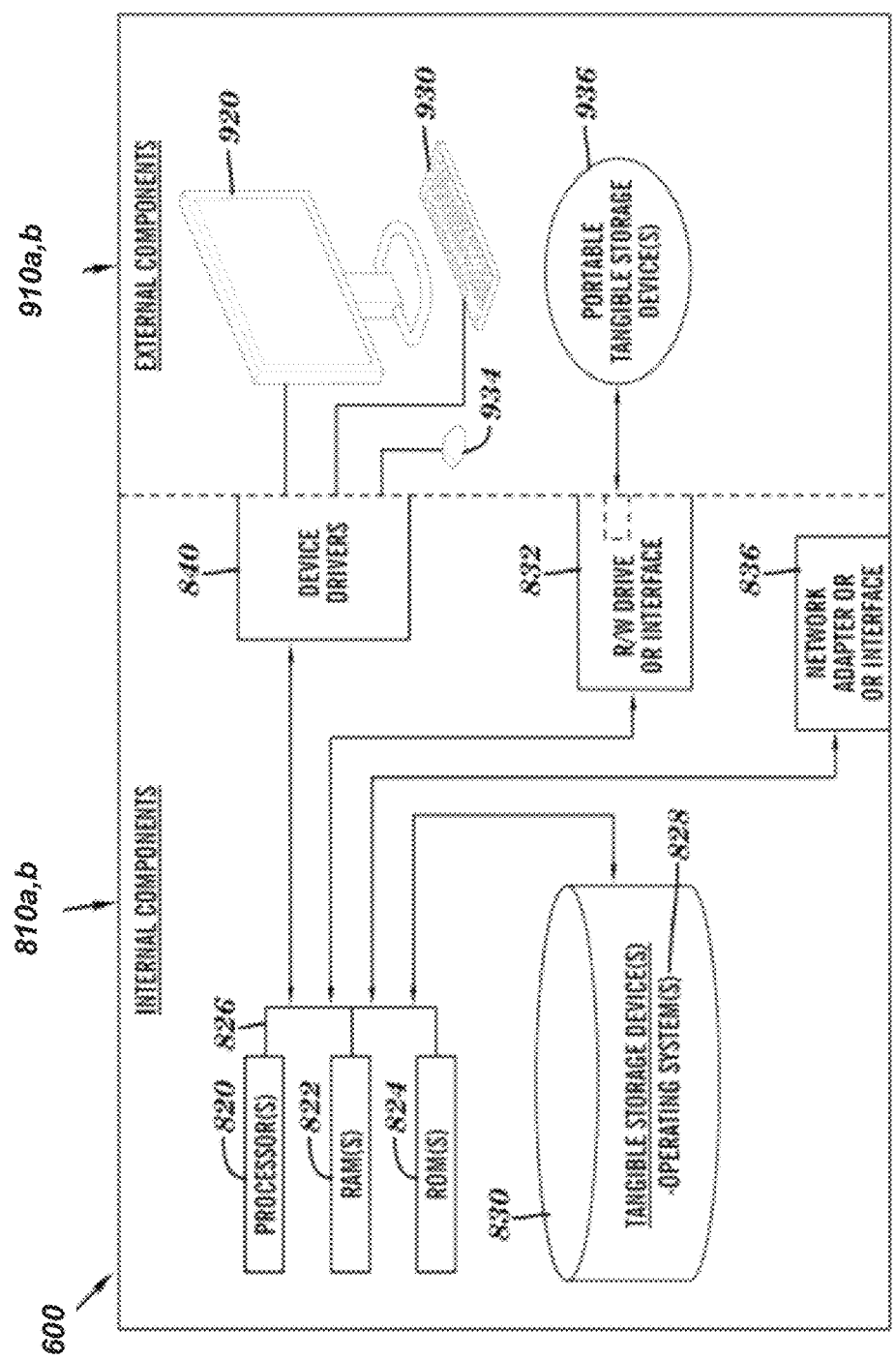
FIG. 6 is a block diagram of the system architecture of a program for providing at least one application assistant on at least one application according to one embodiment.

FIG. 6 is a block diagram 600 of internal and external components of computers depicted in FIG. 1 in accordance with an illustrative embodiment of the present invention. It should be appreciated that FIG. 6 provides only an illustration of one implementation and does not imply any limitations with regard to the environments in which different embodiments may be implemented. Many modifications to the depicted environments may be made based on design and implementation requirements.

Data processing system 810, 910 is representative of any electronic device capable of executing machine-readable program instructions. Data processing system 810, 910 may be representative of a smart phone, a computer system, PDA, or other electronic devices. Examples of computing systems, environments, and/or configurations that may represented by data processing system 810, 910 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) include respective sets of internal components 810 a, b and external components 910 a, b illustrated in FIG. 6. Each of the sets of internal components 810 a, b includes one or more processors 820, one or more computer-readable RAMs 822, and one or more computer-readable ROMs 824 on one or more buses 826, and one or more operating systems 828 and one or more computer-readable tangible storage devices 830. The one or more operating systems 828, the software program 114 (FIG. 1) and the application assistant program 108A (FIG. 1) in client computer 102 (FIG. 1), and the application assistant program 108B (FIG. 1) in network server computer 112 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 6, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 810 *a, b*, also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as an application assistant program 108A and 108B (FIG. 1), can be stored on one or more of the respective portable computer-readable tangible storage devices 936, read via the respective R/W drive or interface 832 and loaded into the respective hard drive 830.

Each set of internal components 810 *a, b* also includes network adapters or interfaces 836 such as a TCP/IP adapter cards, wireless Wi-Fi interface cards, or 3G or 4G wireless interface cards or other wired or wireless communication links. The application assistant program 108A (FIG. 1) and software program 114 (FIG. 1) in client computer 102 (FIG. 1), and the application assistant program 108B (FIG. 1) in network server 112 (FIG. 1) can be downloaded to client computer 102 (FIG. 1) from an external computer via a network (for example, the Internet, a local area network or other, wide area network) and respective network adapters or interfaces 836. From the network adapters or interfaces 836, the application assistant program 108A (FIG. 1) and software program 114 (FIG. 1) in client computer 102 (FIG. 1) and the application assistant program 108B (FIG. 1) in network server computer 112 (FIG. 1) are loaded into the respective hard drive 830. The network may comprise copper wires, optical fibers, wireless transmission, routers, firewalls, switches, gateway computers and/or edge servers.

Each of the sets of external components 910 *a, b* can include a computer display monitor 920, a keyboard 930, and a computer mouse 934. External components 910 *a, b* can also include touch screens, virtual keyboards, touch pads, pointing devices, and other human interface devices. Each of the sets of internal components 810 *a, b* also includes device drivers 840 to interface to computer display monitor 920, keyboard 930, and computer mouse 934. The device drivers 840, R/W drive or interface 832 and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
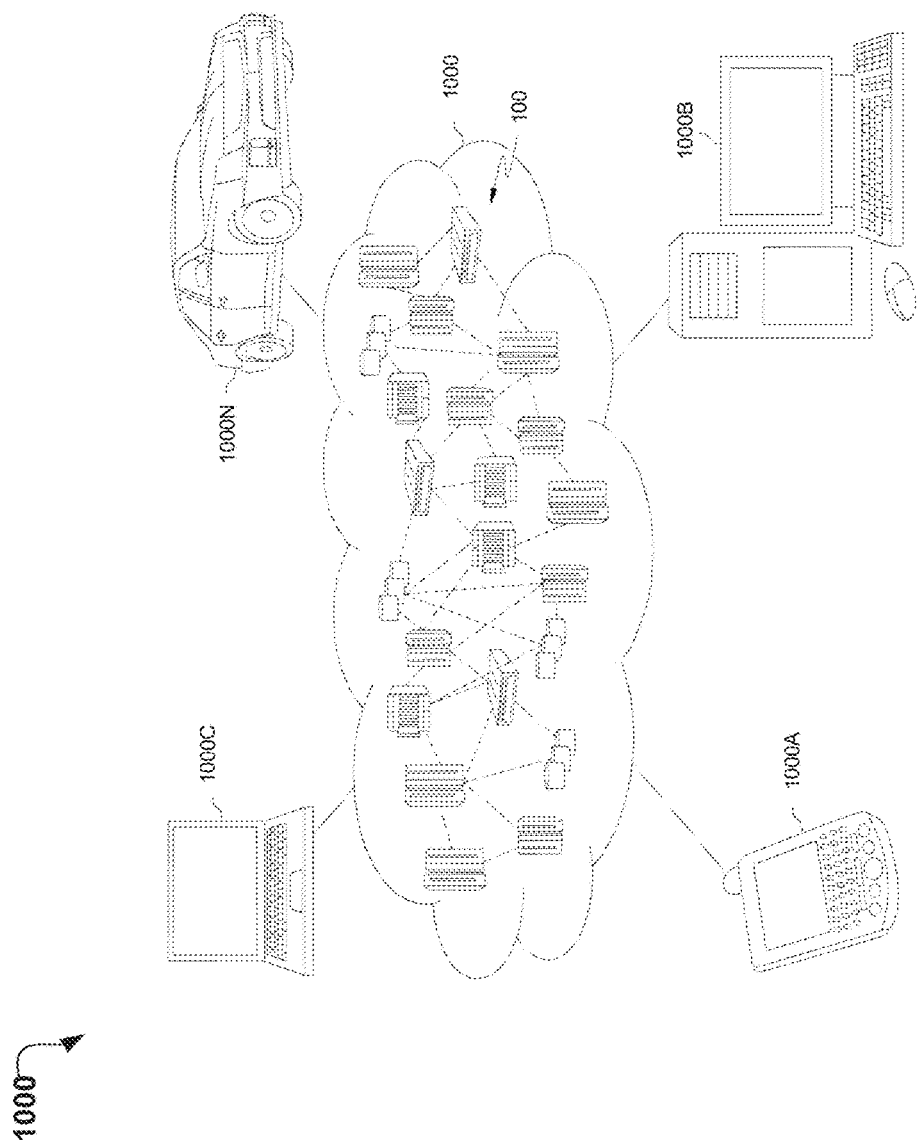
FIG. 7 is a block diagram of an illustrative cloud computing environment including the computer system depicted in FIG. 1, in accordance with an embodiment of the present disclosure.

Referring now to FIG. 7, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 7 are intended to be illustrative only and that computing nodes 100 and cloud computing environment 1000 can communicate with any type of computerized device over any type of network and/or network addressable connection (e.g., using a web browser).

Figure 8:
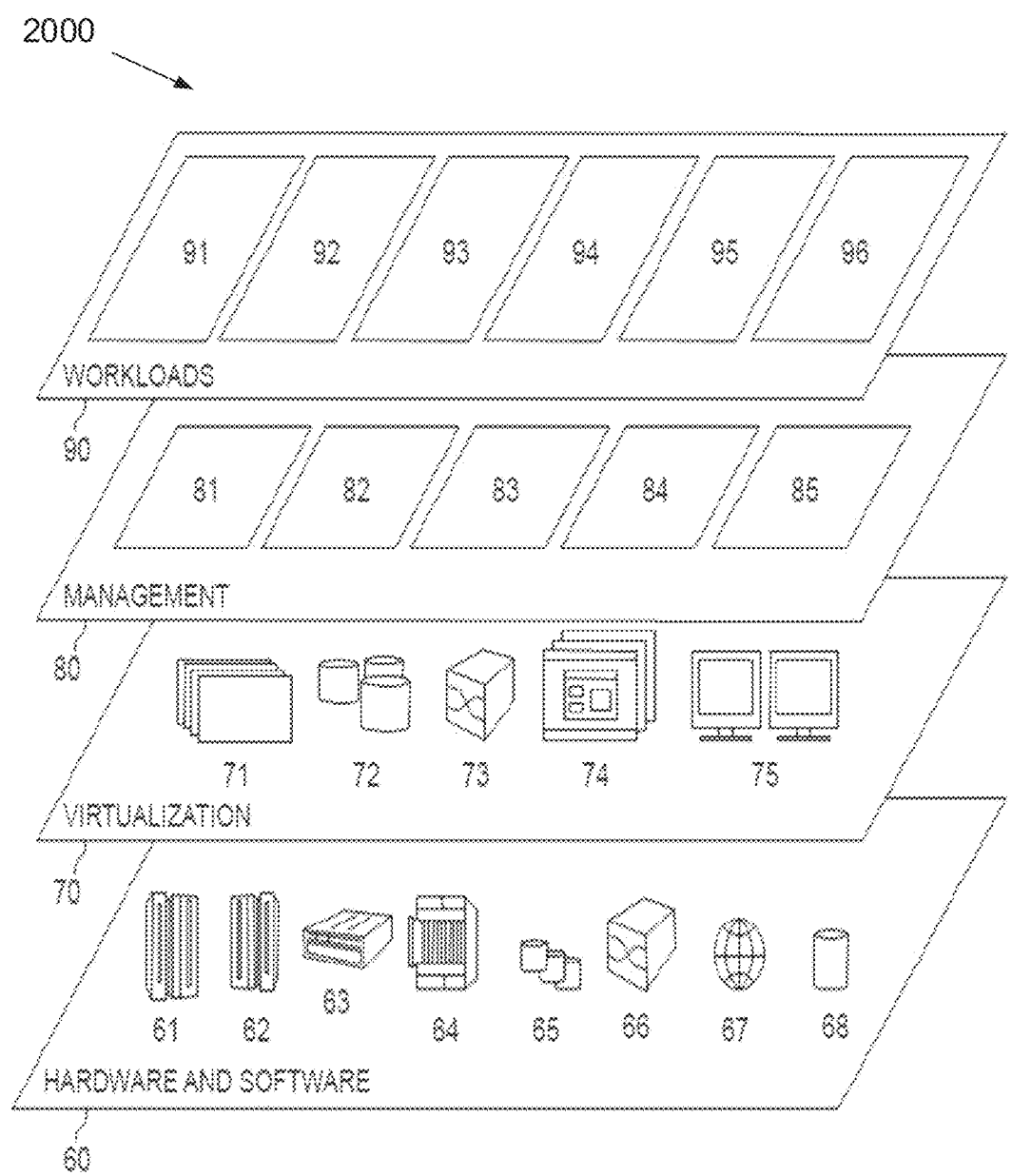
FIG. 8 is a block diagram of functional layers of the illustrative cloud computing environment of FIG. 7, in accordance with an embodiment of the present disclosure.

Referring now to FIG. 8, a set of functional abstraction layers 2000 provided by cloud computing environment 1000 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application assistant 96. An application assistant program 108A, 108B (FIG. 1) may be offered "as a service in the cloud" (i.e., Software as a Service (SaaS)) for applications running on mobile devices 102 (FIG. 1) and may provide application assistants on applications.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for providing at least one application assistant on at least one application, the method comprising:
   performing at least one pattern analysis on the at least one application, wherein performing the at least one pattern analysis comprises:
      retrieving a plurality of objects associated with the at least one application;
      parsing a plurality of information associated with the retrieved plurality of objects using a plurality of DOM nodes or at least one hooking technique;
      determining whether the parsed plurality of information matches a plurality of stored parsed information;
   in response to the determination that the parsed plurality of information matches the plurality of stored parsed information, determining at least one application pattern type based on the at least one pattern analysis;
   determining whether at least one user customization associated with the determined at least one application pattern type is received;
   in response to the determination that the at least one user customization is not received, associating the determined at least one application pattern type with the at least one application, and generating at least one application assistant based on the associated determined at least one application pattern type;
   in response to the determination that the at least one user customization is received, associating the at least one user customization with the at least one application, and generating the at least one application assistant based on the associated at least one user customization;
   in response to generating the at least one application assistant based on the associated determined at least one application pattern type, presenting the generated at least one application assistant in at least one application assistant window on the at least one application; and
   in response to generating the at least one application assistant based on the associated at least one user customization, presenting the generated at least one application assistant in at least one application assistant window on the at least one application;

executing at least one action on the at least one generated application assistant based on at least one user action associated with the at least one application.

2. The method of claim 1, wherein the plurality of application features are selected from a group comprising at least one of a plurality of keywords, a plurality of styles, a plurality of site names, and a plurality of labels.

3. The method of claim 1, wherein the at least one application pattern type is selected from a group comprising at least one of a shopping pattern type, a translator pattern type, a social pattern type, a picture pattern type, a document pattern type, and a currency conversion pattern type.

4. The method of claim 1, wherein parsing the plurality of information associated with the retrieved plurality of objects using at least one hooking technique further comprises: using at least one hook server to receive the collected plurality of application features.

5. The method of claim 1, wherein the at least one application assistant window is selected based on a group comprising at least one of a fixed application assistant window and a floating application assistant window.

6. The method of claim 1, wherein the executed at least one action is selected from a group comprising at least one of an update of a social media status, a calculation of a total price associated with a plurality of added items, a currency conversion, an editing of at least one picture, and a translation of at least one document.

7. A computer system for providing at least one application assistant on at least one application, comprising:
one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:
performing at least one pattern analysis on the at least one application, wherein performing the at least one pattern analysis comprises:
retrieving a plurality of objects associated with the at least one application;
parsing a plurality of information associated with the retrieved plurality of objects using a plurality of DOM nodes or at least one hooking technique;
determining whether the parsed plurality of information matches a plurality of stored parsed information;
in response to the determination that the parsed plurality of information matches the plurality of stored parsed information, determining at least one application pattern type based on the at least one pattern analysis;
determining whether at least one user customization associated with the determined at least one application pattern type is received;
in response to the determination that the at least one user customization is not received, associating the determined at least one application pattern type with the at least one application, and generating at least one application assistant based on the associated determined at least one application pattern type;
in response to the determination that the at least one user customization is received, associating the at least one user customization with the at least one application, and generating the at least one application assistant based on the associated at least one user customization;
in response to generating the at least one application assistant based on the associated determined at least one application pattern type, presenting the generated at least one application assistant in at least one application assistant window on the at least one application; and
in response to generating the at least one application assistant based on the associated at least one user customization, presenting the generated at least one application assistant in at least one application assistant window on the at least one application;
executing at least one action on the at least one generated application assistant based on at least one user action associated with the at least one application.

8. The computer system of claim 7, wherein the plurality of application features are selected from a group comprising at least one of a plurality of keywords, a plurality of styles, a plurality of site names, and a plurality of labels.

9. The computer system of claim 7, wherein the at least one application pattern type is selected from a group comprising at least one of a shopping pattern type, a translator pattern type, a social pattern type, a picture pattern type, a document pattern type, and a currency conversion pattern type.

10. The computer system of claim 7, wherein parsing the plurality of information associated with the retrieved plurality of objects using at least one hooking technique further comprises: using at least one hook server to receive the collected plurality of application features.

11. The computer system of claim 7, wherein the at least one application assistant window is selected based on a group comprising at least one of a fixed application assistant window and a floating application assistant window.

12. The computer system of claim 7, wherein the executed at least one action is selected from a group comprising at least one of an update of a social media status, a calculation of a total price associated with a plurality of added items, a currency conversion, an editing of at least one picture, and a translation of at least one document.

13. A computer program product for providing at least one application assistant on at least one application, comprising:
one or more computer-readable storage devices and program instructions stored on at least one of the one or more tangible storage devices, the program instructions executable by a processor, the program instructions comprising:
program instructions to perform at least one pattern analysis on the at least one application, wherein the program instructions to perform the at least one pattern analysis comprises:
program instructions to retrieve a plurality of objects associated with the at least one application;
program instructions to parse a plurality of information associated with the retrieved plurality of objects using a plurality of DOM nodes or at least one hooking technique;
program instructions to determine whether the parsed plurality of information matches a plurality of stored parsed information;
program instructions to, in response to the determination that the parsed plurality of information matches the plurality of stored parsed information, determine at least one application pattern type based on the at least one pattern analysis;
program instructions to determine whether at least one user customization associated with the determined at least one application pattern type is received;
program instructions to, in response to the determination that the at least one user customization is not received, associate the determined at least one application pattern type with the at least one application, and generate at least one application assistant based on the associated determined at least one application pattern type;

program instructions to, in response to the determination that the at least one user customization is received, associate the at least one user customization with the at least one application, and generate the at least one application assistant based on the associated at least one user customization;

program instructions to, in response to generating the at least one application assistant based on the associated determined at least one application pattern type, present the generated at least one application assistant in at least one application assistant window on the at least one application; and program instructions to, in response to generating the at least one application assistant based on the associated at least one user customization, present the generated at least one application assistant in the at least one application assistant window on the at least one application;

executing at least one action on the at least one generated application assistant based on at least one user action associated with the at least one application.

14. The computer program product of claim 13, wherein the plurality of application features are selected from a group comprising at least one of a plurality of keywords, a plurality of styles, a plurality of site names, and a plurality of labels.

15. The computer program product of claim 13, wherein the at least one application pattern type is selected from a group comprising at least one of a shopping pattern type, a translator pattern type, a social pattern type, a picture pattern type, a document pattern type, and a currency conversion pattern type.

16. The computer program product of claim 13, wherein the at least one application assistant window is selected based on a group comprising at least one of a fixed application assistant window and a floating application assistant window.

17. The computer program product of claim 13, wherein the executed at least one action is selected from a group comprising at least one of an update of a social media status, a calculation of a total price associated with a plurality of added items, a currency conversion, an editing of at least one picture, and a translation of at least one document.

* * * * *